United States Patent
Pesyna et al.

(10) Patent No.: US 10,001,084 B2
(45) Date of Patent: Jun. 19, 2018

(54) AIRCRAFT POWERPLANT WITH MOVEABLE NOZZLE MEMBER

(75) Inventors: Kenneth M. Pesyna, Carmel, IN (US); Bryan Henry Lerg, Westfield, IN (US); Michael Abraham Karam, Plainfield, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 829 days.

(21) Appl. No.: 13/523,315

(22) Filed: Jun. 14, 2012

(65) Prior Publication Data

US 2012/0317957 A1     Dec. 20, 2012

Related U.S. Application Data

(60) Provisional application No. 61/496,876, filed on Jun. 14, 2011.

(51) Int. Cl.
| | |
|---|---|
| *F02K 3/077* | (2006.01) |
| *F02K 3/115* | (2006.01) |
| *F02C 7/18* | (2006.01) |

(52) U.S. Cl.
CPC .............. *F02K 3/077* (2013.01); *F02C 7/18* (2013.01); *F02K 3/115* (2013.01); *Y02T 50/675* (2013.01)

(58) Field of Classification Search
CPC .................................. F02K 3/075; F02K 3/077
See application file for complete search history.

(56) References Cited

U.S. PATENT DOCUMENTS

| | | |
|---|---|---|
| 4,064,692 A | 12/1977 | Johnson et al. |
| 4,527,388 A | 7/1985 | Wallace, Jr. |
| 5,136,840 A * | 8/1992 | Nash ........................... 60/226.3 |
| 5,414,992 A | 5/1995 | Glickstein |
| 6,857,600 B1 | 2/2005 | Walker et al. |
| 2005/0109012 A1* | 5/2005 | Johnson ...................... 60/226.1 |
| 2005/0268612 A1 | 12/2005 | Rolt |
| 2007/0245739 A1 | 10/2007 | Stretton et al. |
| 2008/0110152 A1 | 5/2008 | Kemper et al. |
| 2008/0230651 A1 | 11/2008 | Porte |
| 2009/0053058 A1 | 2/2009 | Kohlenberg et al. |

(Continued)

OTHER PUBLICATIONS

International Search Report and Written Opinion, PCT/US2012/042470, Rolls-Royce North American Technologies, Inc., dated Aug. 31, 2012.

(Continued)

*Primary Examiner* — Craig Kim
(74) *Attorney, Agent, or Firm* — Barnes & Thornburg LLP

(57) ABSTRACT

A gas turbine engine system is disclosed which includes a core passage and a bypass passage which can be configured as a fan bypass duct or a third stream bypass duct. The core passage and bypass passage are routed to flow through a nozzle before exiting overboard an aircraft. The nozzle includes moveable members capable of changing a configuration of the nozzle. In one form the moveable members are capable of changing throat area for portions of the nozzle that receive working fluid from the core passage and the bypass passage. The bypass passage can include a branch. In one form the branch can include a heat exchanger. The bypass passage can also provide cooling to one or more portions of the nozzle, such as cooling to a deck of the nozzle.

27 Claims, 9 Drawing Sheets

(56) References Cited

U.S. PATENT DOCUMENTS

2009/0158703 A1    6/2009   Petty
2009/0169359 A1    7/2009   Murphy et al.
2009/0297339 A1   12/2009   Schott et al.
2010/0043393 A1    2/2010   Zamora et al.

OTHER PUBLICATIONS

International Search Report and Written Opinion, PCT/US2012/042461, Rolls-Royce North American Technologies, Inc., dated Sep. 7, 2012.

\* cited by examiner

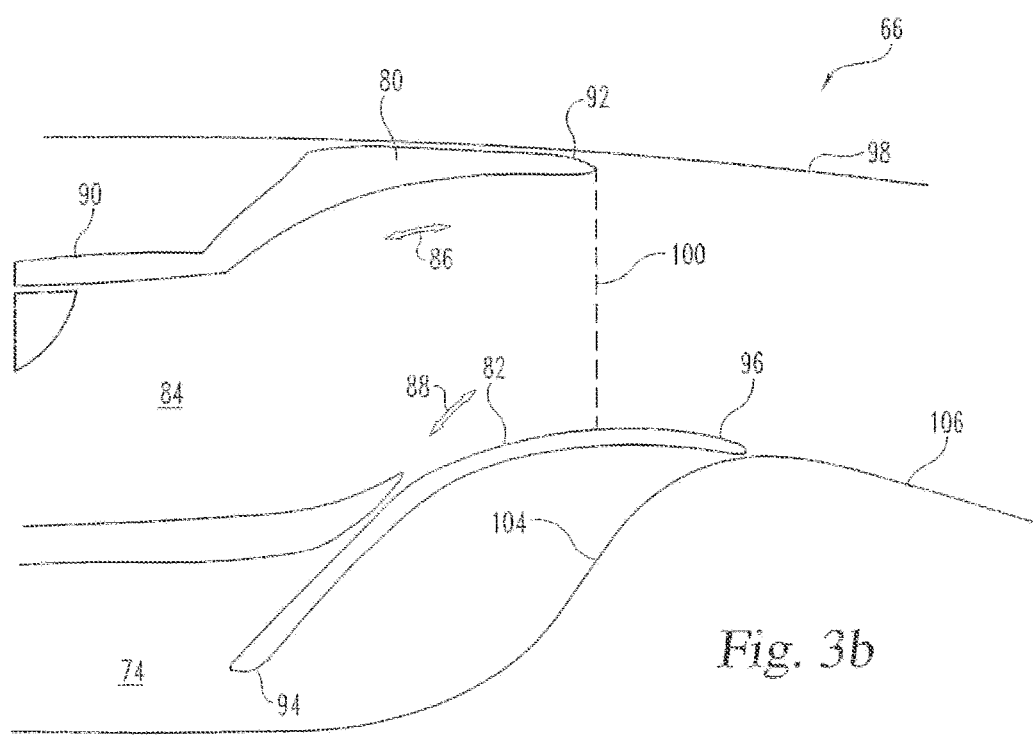

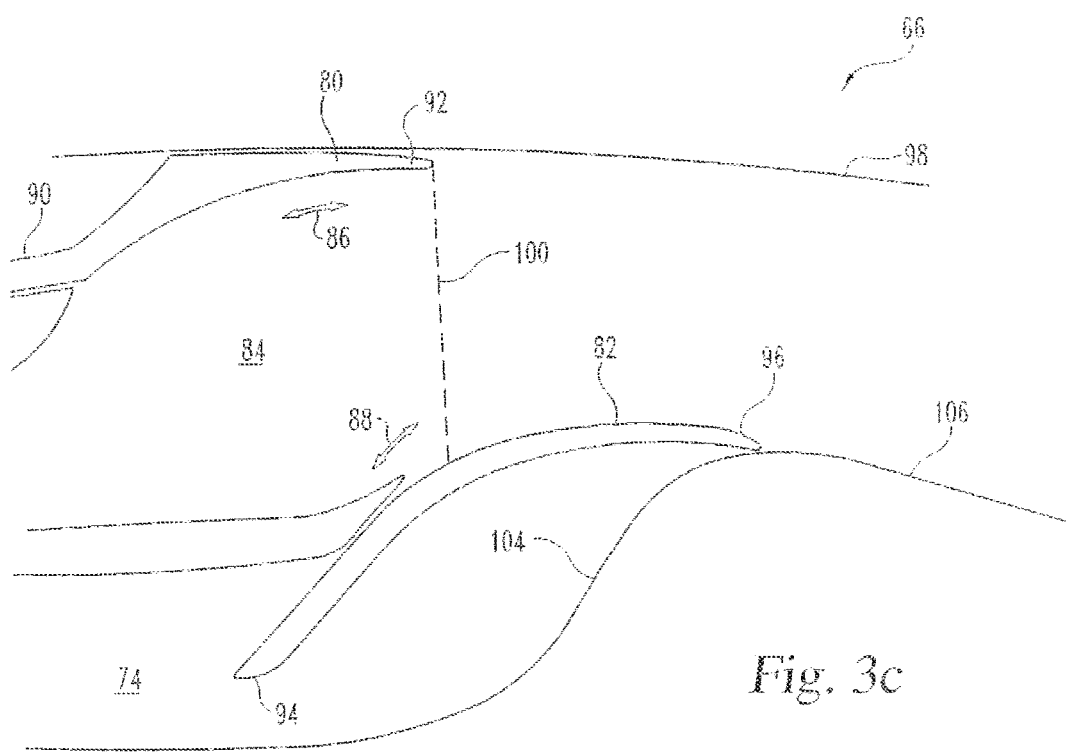

AIRCRAFT POWERPLANT WITH MOVEABLE NOZZLE MEMBER

CROSS REFERENCE TO RELATED APPLICATIONS

The present application claims benefit of U.S. Provisional Patent Application No. 61/496,876 filed Jun. 14, 2011, which is incorporated herein by reference.

TECHNICAL FIELD

The present invention generally relates to aircraft powerplants, and more particularly, but not exclusively, to aircraft nozzles.

BACKGROUND

Providing flow path configurations for aircraft powerplants capable of operating over a range of conditions remains an area of interest. Some existing systems have various shortcomings relative to certain applications. Accordingly, there remains a need for further contributions in this area of technology.

SUMMARY

One embodiment of the present invention is a unique aircraft powerplant system. Other embodiments include apparatuses, systems, devices, hardware, methods, and combinations for flowing working fluid within an aircraft powerplant. Further embodiments, forms, features, aspects, benefits, and advantages of the present application shall become apparent from the description and figures provided herewith.

BRIEF DESCRIPTION OF THE FIGURES

FIG. 3b depicts an embodiment of a nozzle.
FIG. 3c depicts an embodiment of a nozzle.

DETAILED DESCRIPTION OF THE ILLUSTRATIVE EMBODIMENTS

Figure 1:
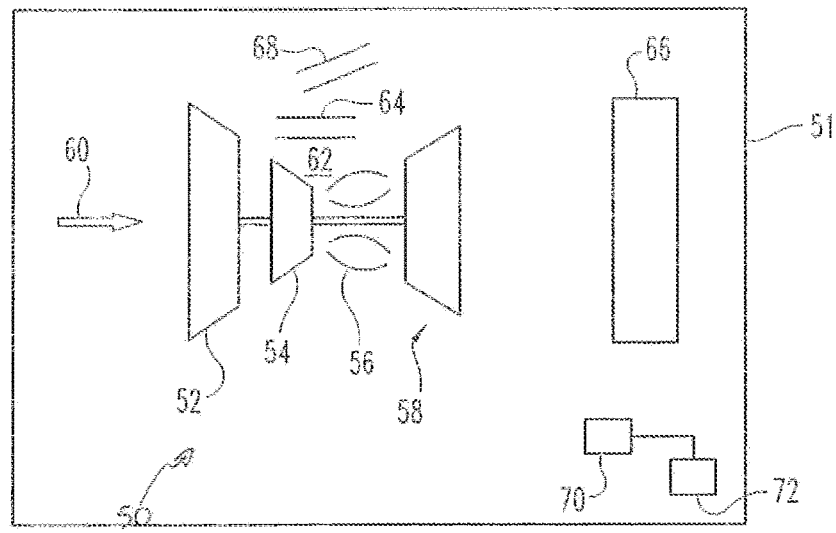
FIG. 1 depicts an embodiment of an aircraft and gas turbine engine.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With reference to FIG. 1, there is illustrated a schematic representation of one form of a gas turbine engine 50 used as a powerplant for an aircraft 51. As used herein, the term "aircraft" includes, but is not limited to, airplanes, unmanned space vehicles, fixed wing vehicles, variable wing vehicles, unmanned combat aerial vehicles, tailless aircraft, and other airborne and/or extraterrestrial (spacecraft) vehicles. The gas turbine engine 50 includes a fan 52, compressor 54, combustor 56, and turbine 58. In one form of operation, a working fluid 60 such as air entering the gas turbine engine 50 is accelerated by the fan 52. Some of the working fluid enters a core passage 62 of the core engine which includes a passage through the compressor 54, combustor 56, and turbine 58. Working fluid that does not pass through the core passage 62 bypasses the core engine and flows in a fan bypass duct 64. After passing through the core engine an exhaust flow is discharged through a nozzle 66. In some forms the working fluid passing through the fan bypass duct 64 is combined with the exhaust flow prior to being discharged through the nozzle 66, but in other forms the working fluid passing through the fan bypass duct 64 can exit elsewhere.

The gas turbine engine 50 also includes a third stream bypass duct 68 capable of flowing a working fluid conveyed via a turbomachinery component powered by operation of the gas turbine engine 50. In one form the third stream bypass duct 68 is operable to withdraw a portion of working fluid traversing through the gas turbine engine 50, such as but not limited to through the fan bypass duct 64. In some embodiments the third stream bypass duct 68 can withdraw a portion of the working fluid at a location downstream of a fan that provides working fluid to the fan bypass duct 64. In yet another form the third stream bypass duct 68 can have its own turbomachinery component such as but not limited to a blade portion separated from and disposed radially outward of a fan bypass portion of a bladed turbomachinery component. The third stream bypass duct 68 is operable to convey a quantity of working fluid 60 to provide an additional thrust capability to the propulsion system and/or to provide an additional stream of pressurized air for use as a coolant or energy source. The relatively low temperature of the working fluid though the third stream bypass duct 68 can provide a thermal management heat sink and could allow use of relatively economical materials in exhaust ducting and liners. In one form the third stream bypass duct 68 can convey a quantity of working fluid 60 to be used as an additional energy source to provide power for electrical or mechanical devices. A flow of working fluid through the third stream bypass duct 68 can be combined with working fluid flowing through either or both of the fan bypass duct 64 and core passage 62 to flow through the nozzle 66, but some embodiments can include the working fluid through the third stream bypass duct 68 as exiting independent of any given nozzle that conveys one or more flows.

In one non-limiting embodiment the third stream bypass duct 68 can withdraw working fluid 60 from the fan bypass duct 64 at a location downstream of the fan 52. In this configuration the gas turbine engine 50 includes the core passage 62, fan bypass duct 64, and third stream bypass duct 68, all of which are capable of flowing some portion of a working fluid received through an inlet to the gas turbine engine 50. In some embodiments the third stream bypass duct 68 can flow a quantity of working fluid approaching that amount carried through the fan bypass duct 64. The third stream bypass duct 68 can withdraw working fluid 60 from the fan bypass duct 64 at locations other than those discussed above. To set forth just one non-limiting example, the third stream bypass duct 68 can withdraw working fluid at a location between fan stages.

The working fluid 60 withdrawn through the third stream bypass duct 68 can be recombined with an exhaust flow of the gas turbine engine 50 prior to being discharged to ambient conditions. For example, the working fluid that flows through the third stream bypass duct 68 can be recombined in the nozzle 66 with a working fluid that flowed through the core passage 62 and the fan bypass duct 64. Various embodiments of the nozzle 66 capable of combining flow from any of the core passage 62, fan bypass duct 64, and third stream bypass duct 68 will be described further below.

The gas turbine engine 50 can take any variety of forms. For example, the gas turbine engine 50 can have any number of spools capable of driving any number of compressor 54 and turbine 58 sections. In some forms the gas turbine engine 50 can be an adaptive cycle, variable cycle, combined cycle engine and can be used at a variety of flight conditions. As such, the aircraft 51 typically includes a sensor 70 and controller 72 for determining flight condition and operating one or more systems aboard the aircraft, such as but not limited to the gas turbine engine 50.

The sensor 70 can typically be used to measure aircraft flight condition such as speed and altitude, to set forth just two non-limiting examples, and can output any variety of data whether sensed or calculated. For example, the sensor 70 can sense and output conditions such as static temperature, static pressure, total temperature, and/or total pressure, among possible others. In addition, the flight condition sensor 70 can output calculated values such as, but not limited to, equivalent airspeed, altitude, and Mach number. Any number of other sensed conditions or calculated values can also be output. The flight condition sensor 70 provides data to the controller 72 and can output values in either analog or digital form.

The controller 72 is provided to monitor and control engine operations. The controller 72 can be comprised of digital circuitry, analog circuitry, or a hybrid combination of both of these types. Also, the controller 72 can be programmable, an integrated state machine, or a hybrid combination thereof. The controller 72 can include one or more Arithmetic Logic Units (ALUs), Central Processing Units (CPUs), memories, limiters, conditioners, filters, format converters, or the like which are not shown to preserve clarity. In one form, the controller 72 is of a programmable variety that executes algorithms and processes data in accordance with operating logic that is defined by programming instructions (such as software or firmware). Alternatively or additionally, operating logic for the controller 72 can be at least partially defined by hardwired logic or other hardware. In one particular form, the controller 72 is configured to operate as a Full Authority Digital Engine Control (FADEC); however, in other embodiments it may be organized/configured in a different manner as would occur to those skilled in the art. It should be appreciated that controller 72 can be exclusively dedicated control of the gas turbine engine 50, or may further be used in the regulation/control/activation of one or more other subsystems or aspects of aircraft 51, such as but not limited to the nozzle 66.

Figure 2A:
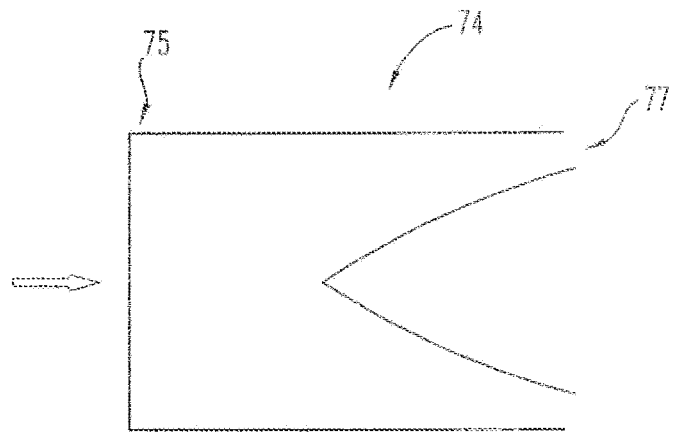
FIG. 2a depicts an embodiment of a bypass passage.
Figure 2C:
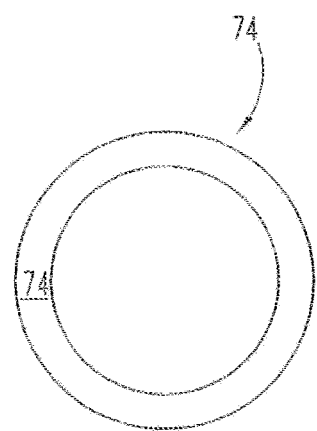
FIG. 2c depicts an embodiment of a bypass passage.
Figure 2B:
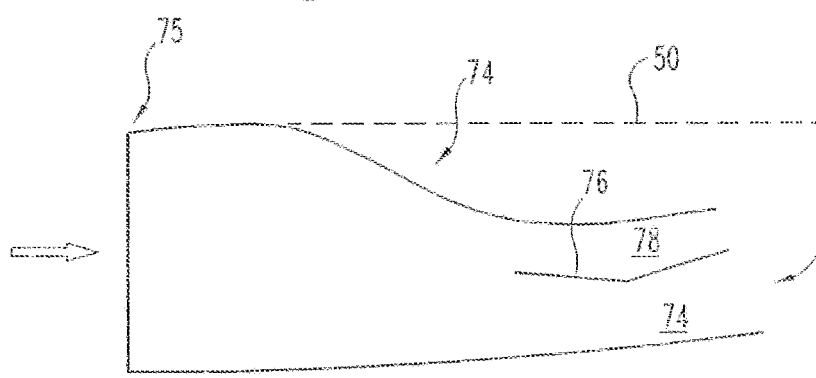
FIG. 2b depicts an embodiment of a bypass passage.

Turning now to FIGS. 2a, 2b, and 2c one embodiment of a bypass passage 74 capable of providing a flow of working fluid to the nozzle 66 is depicted in which the bypass passage 74 is in an annular form at an upstream station 75 of the gas turbine engine 50 (shown in FIG. 2c), but is split to form a passage displaced to one side of the gas turbine engine 50 and partially extending around the periphery of the engine 50 at a downstream station. FIG. 2a depicts a top view of the bypass passage 74, and FIG. 2b depicts a side view. The bypass passage 74 is shown in the illustrated embodiment as being ducted to a displaced position on a lower side of the gas turbine engine 50 in an underslung configuration, but other configurations are also contemplated herein. The terms "top", "front", "side", "lower" and other relational words are used herein for ease of reference only and are not otherwise limiting to any particular embodiment. The bypass passage 74 extends between an upstream side 75 to a downstream side 77. The dashed line indicated by reference numeral 50 indicates an outer casing of one embodiment of the gas turbine engine 50 such that the bypass passage 74 at least in part encloses the engine 50.

The bypass passage 74 can be the third stream bypass duct 68 as described above. The bypass passage 74 can further include a splitter 76 useful to divide a working fluid within the bypass passage 74. In one form the splitter 76 can be configured to route a portion of the working fluid in the bypass passage 74 to flow within a branch 78 as shown in FIG. 2b. As will be appreciated, a flow of working fluid through the branch 78 can be combined with a flow of working fluid through any one or more of the core passage 62, fan bypass duct 64, and third stream bypass duct 68 to flow through the nozzle 66, but some embodiments can include the working fluid through the branch 78 as exiting independent of any given nozzle that combines any two or more flows. Any number of splitters 76 can be used in various embodiments to form any number of branches 78. The splitter 76 can take any variety of arrangements useful to split flows between the bypass passage 74 and the branch 78. Any number of splitters can be used to form any number of branches. In some embodiments, a splitter 76 can be used to form branches 78 on either side of the gas turbine engine. The splitter 76 can divide fluid circumferentially as shown, but other variations of splitting flow are also contemplated herein.

The branch 78 can be routed to various portions of the gas turbine engine 50 and can deliver working fluid to, among other possible locations, the nozzle 66. As will also be understood given the description herein, the branch 78 can also be routed to various portions of the aircraft 51. The illustrated embodiment includes a pair of branches 78 disposed opposite one another, but other embodiments can include any variety of configurations.

In one non-limiting embodiment a device that would benefit from flow rate flexibility and control provided by the embodiments herein can be used with one or more of the branches. For example, a device configured to thermodynamically interact with, and in some forms operate upon, the working fluid can be coupled with one or both branches 78. In one form the device can be disposed in a branch 78 but other locations are also contemplated in which the device interacts with working fluid conveyed through one or more branches 78. In one non-limiting example, the device can be a heat exchanger that can be used to cool a relatively high temperature component associated with the gas turbine engine 50 and/or the aircraft 51 using the working fluid traversing through the branch 78. Such a heat exchanger can be a solid state variety, a heat exchanger including a fluid that flows through the heat exchanger, a fluid that flows in a closed circuit within the heat exchanger, a phase change heat exchanger, etc, to set forth just a few non-limiting embodiments. Any given heat exchanger can be located anywhere within the branch 78. To set forth just a few non-limiting examples of how the heat exchanger is disposed in the branch 78 and interacts with working fluid in the branch 78, the working fluid can flow through, around, over, etc, or a combination thereof, of the heat exchanger. The heat exchanger, and for that matter any device that would benefit from being coupled with the branch 78, can be located anywhere with the branch 78 such as at the beginning of the branch 78, the end of the branch, or any intermediate position. In some forms the device can be used to form part of the passage whether at the beginning, end, or anywhere in between. In some forms a heat conducting plate or other device can be interposed between the working fluid and the heat exchanger. Multiple heat exchangers can be used in various embodiments. To set forth just one non-limiting example, in those embodiments having more than one branch 78, each branch 78 can have at least one heat exchanger.

The branches 78 can be configured to provide a relatively constant flow of working fluid to provide cooling to the heat exchanger and can do so in some embodiments even with changes in engine power settings. For example, where the bypass passage 74 takes the form of the third stream bypass duct 68, the branch 78 can be configured to provide consistent flow rates therethrough while larger variations are experienced in the bypass passage 74 as a result of engine operations. In some non-limiting forms the branch 78 can have a constant flow rate during many and/or all modes of engine operation which include a range of engine conditions, while in other non-limiting forms the branch 78 can have some amount of fluctuation in flow rate that nonetheless remains a smaller fluctuation than the fluctuation in flow rate in the bypass passage 74 over those same ranges of engine conditions. In one non-limiting example, the branch 78 can have a flow rate that remains substantially the same from minimum to military power settings, and sometimes throughout afterburner operation as well. Other ranges are also contemplated.

The ability to provide substantially the same flow rates can be assisted through use of variable geometry flow path provided in the bypass passage 74, some embodiments of which are discussed further below. Additionally and/or alternatively, in some forms the branches can have fixed or variable geometry, as discussed further below. Thus, it is possible to operate a variable geometry flow paths in either or both the bypass passage 74 and the branch 78 to provide for substantially the same flow rate within the branch 78 over a range of engine operation. Various embodiments of the variable geometry flow paths are discussed further below, and can take the form of a pivoting mechanism, translating mechanism, fluidic mechanism, etc to set forth just a few non-limiting examples of the ability to change a flow area.

As will be appreciated, the variable geometry mechanisms can also be used to control flow rates to other values that can vary depending upon a need of a device coupled with the branch, such as with a heat exchanger coupled with the branch. In such embodiments the variable geometry mechanisms can control flow rates, such as a flow rate that varies with demand requirement of the device, either at a specific engine operating condition, or across a range of engine operating conditions. To set forth just one more additional example, the flow rate can be controlled in a manner that is dependent upon a desired interaction with the thermodynamic device. In one form the thermodynamic device may have a variable heat load during operation of the gas turbine engine where the heat load is required to be rejected to the working fluid flowing through the branch 78.

The variable geometry mechanisms, whether associated with one or more of the passages/branches, can be controlled to accommodate the varying heat rejection requirements. For example, if a high temperature is required to be rejected the flow rate can be adjusted via the variable geometry mechanisms, to increase flow rate and thus heat transfer. The adjustment to the variable geometry mechanism can take place within the controller 72 based upon a sensed temperature of the heat exchanger, fluid within the heat exchanger, etc., to set forth just one possibility. The subsequent change to flow rate in the branch 78 can be satisfactory to the thermodynamic device in some embodiments even if measured temperature climbs somewhat above the target value consistent with operation of feedback controllers, feedforward controllers, etc. and bands of satisfactory performance associated with controller operation.

Figure 8:
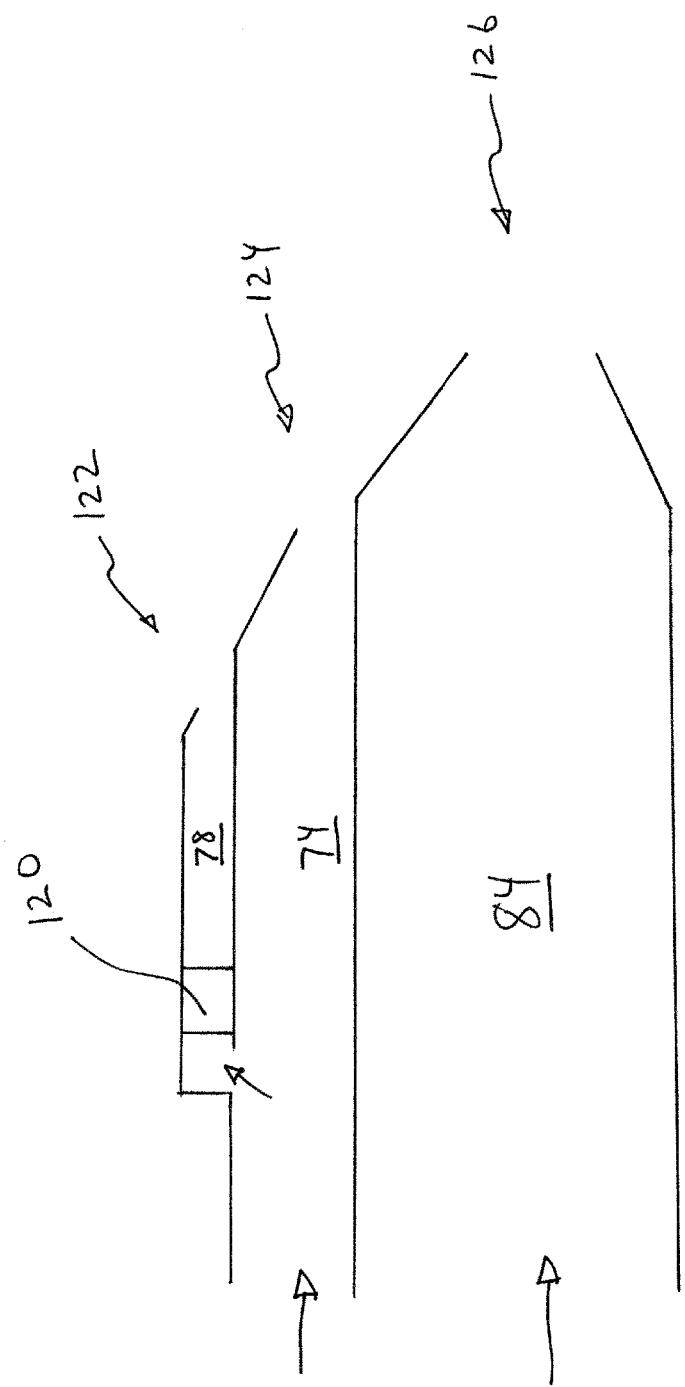
FIG. 8 depicts an embodiment of various passages.

As will be appreciated, FIG. 8 discloses one embodiment of a device in the form of a thermodynamic device that is in the form of a heat exchanger 120 disposed within the branch 78. Such a thermodynamic device can be capable of exchanging at least one of heat and work with the working fluid flowing through the branch 78. The branch 78 includes an exit or nozzle 122 that can be fixed or variable. An exit or nozzle 124 of the bypass passage 74, as well as an exit or nozzle 126 of flow passage 84 (described below), can either or both be fixed or variable. In one form of the present application, the Mach number of the flow entering the branch 78 can be variable and a variable geometry exit 122 can provide for a constant Mach number flow through the branch 78. Given the description it will be understood that heat rejection via heat exchanger 120 and fuel consumption influenced by the bypass passage 74 can be independently controlled in some embodiments. In some forms it may be only necessary to vary the exit or nozzle 124 while fixing the exit or nozzle 122, depending on heat rejection requirements.

The arrangement in FIG. 8 can be applicable to any bypass passage having a branch. For example, the passage labeled as 84 in the figure can represent the core passage 62, the passage labeled 74 in the figure can represent the bypass passage 64, and the passage labeled as 78 can represent a branch from the bypass passage 64. Thus, the arrangement shown in FIG. 8 can be used in many different passages and not limited to a branch from the third stream passage. For that matter, the passage labeled 74 can be a fourth, fifth, sixth, etc stream. In this manner it would be understood that a first passage would be akin to the core passage, the second passage akin to a bypass passage such as a fan bypass, the third passage akin the third stream bypass passage, and so on and so forth with each subsequent stream representing a stream further removed from the core and/or further lower in pressure relative to the core. To set forth just one non-limiting example of what would differentiate the various streams, the second stream such as the fan bypass passage will have a lower pressure than the core stream at a position upstream of the turbine. The third stream will have a lower pressure still than the second stream. A fourth stream a lower pressure still. Etc. Furthermore, though the passages 74 and 78 are shown displaced radially from the passage 84, in some forms one or both of the passages 74 and 78 can be annular. In one form the passage 78 will be understood to be a branch from passage 74 capable of conveying a working fluid from the passage 74 after a working fluid flowing through the passage 74 has already passed a turbomachinery component, such as a fan, and is free from subsequent turbomachinery components through the remainder of the passage 74 downstream from the split in flow to form the passage 78.

Any of the branch 78 and passages 74, 84 are considered to be the passageway that conveys working fluid before the fluid is consumed by a larger volume such as an external exit to ambient conditions, or to a nozzle where it is combined with other flows, to set forth just two non-limiting examples. Thus, multiple segments/conduits/passages can be coupled to form any of the branch 78 and passages 74, 78.

Arrangements as depicted in FIG. 8 will be appreciated given the discussion herein to have numerous variations. For example, any of reference numerals 122, 124, and 126 can represent independent exits, or can be flowed into a nozzle that can be a common nozzle as shown in some embodiments below, or combined into one or more separate nozzles. Whether the reference numerals 122, 124, 126 represent exits or nozzles or a combination thereof, no limitation is hereby intended of the numerals 122, 124, 126. The exits or nozzles represented by numerals 122, 124, 126 can be at locations that are separate from one another such that none has an influence on the flow of the others prior to being discharged from the aircraft 51 or gas turbine engine 50. In still other embodiments, any two or more of the exits or nozzles 122, 124, 126 can be positioned such that the flows influence each other. In addition, the variable nature of the exit or nozzles 122, 124, and 126 can, but need not use similar variable geometry flow path mechanisms. For example, the exit or nozzle 122 can use a pivoting arrangement while the exit or nozzle 124 can use a translating arrangement. Furthermore, any or all of the variable geometry flow path mechanisms can be controlled by the controller 72. Thus, no limitation is hereby intended regarding the combinations and arrangements of any of the flow paths, exits or nozzles, etc.

Figure 3A:
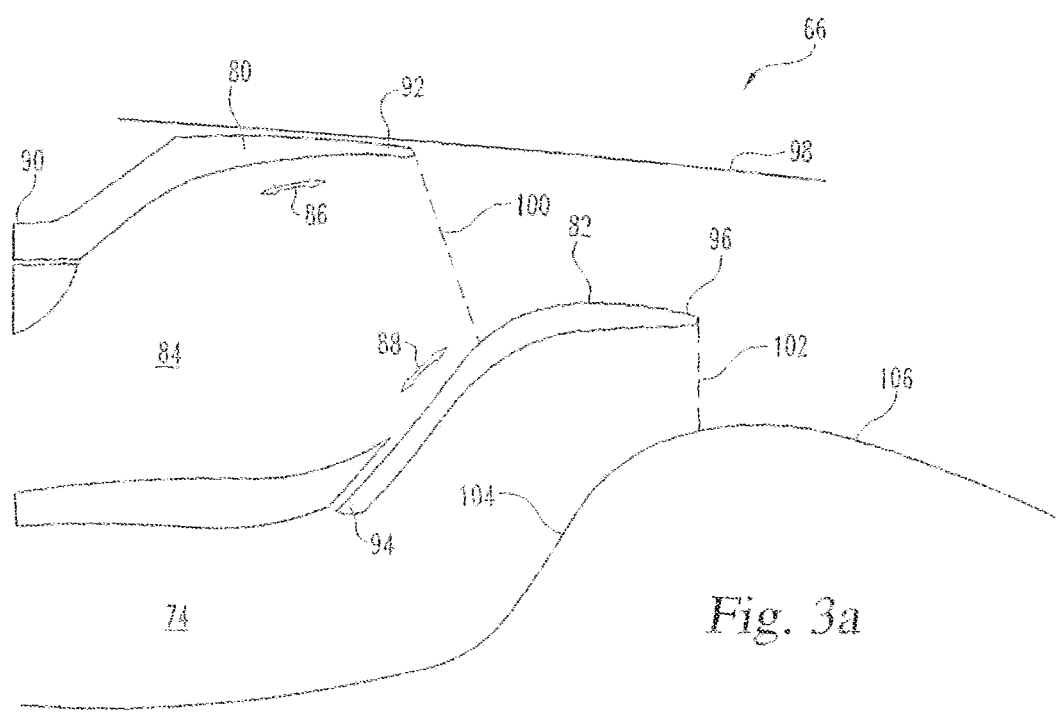
FIG. 3a depicts an embodiment of a nozzle.

Turning now to FIGS. 3a, 3b, and 3c, a side view is shown of the nozzle 66 in which a working fluid from the bypass passage 74 and a working fluid from a flow passage 84 is received. The flow passage 84 can be either or both the core passage 62 and fan bypass duct 64. To set forth just one non-limiting example, in some embodiments the flow passage 84 can include working fluid from both the core passage and fan bypass duct 64. The working fluid flowing through the bypass passage 74 can be received by the nozzle 66 from the downstream side 77 as shown above in FIGS. 2a and 2b. In those embodiments having the branch 78 the working fluid received by the nozzle 66 can, but need not, be separate from working fluid in the branch 78.

The nozzle 66 includes an upper translatable member 80 capable of translating along the indication shown by reference numeral 86 and a lower translatable member 82 capable of translating along the indication shown by reference numeral 88, both members 80 and 82 of which are capable of changing a configuration of the nozzle 66. As will be appreciated, either or both the members 80 and 82 can be capable of translating in a number of different ways, including along a straight line in some embodiments. Although the indications shown by reference numerals 86 and 88 are not parallel, not all embodiments need be arranged as such. As will be appreciated, in some embodiments either or both members 80 and 82 have no lateral hingelines.

The translatable member 80 includes an upstream side 90 and a downstream side 92. The translatable member 82 includes an upstream side 94 and a downstream side 96. As shown in the figures, the downstream side 92 of the translatable member 80 can be configured to follow along the wall 98 of the nozzle 66. The downstream side 96 of the translatable member 82 can be moved such that it closes and/or substantially discourages working fluid from exiting the bypass passage 74 to the nozzle 66, as shown in FIGS. 3b and 3c.

A flow area 100 can be defined between the translatable member 80 and translatable member 82. In some embodiments the flow area 100 can be referred to as A8. A flow area 102 can be defined between the translatable member 82 and a nozzle structure 104 which in some embodiments can be referred to as A28. The areas 100 and 102 can be changed during operation of the gas turbine engine 50. For example, the configuration shown in FIG. 3a depicts an arrangement of nozzle members to provide for an optimum specific fuel consumption. The configuration shown in FIG. 3b depicts an arrangement of the nozzle members to provide for a maximum thrust mode without operation of an afterburner. The configuration shown in FIG. 3c depicts an arrangement of the nozzle members to provide for a maximum thrust mode augmented with operation of an afterburner.

The nozzle 66 also includes a surface 106 downstream of the translatable member 82 which is used for an exhaust of the nozzle to flow along. The exhaust is composed of either or both the working fluid from the bypass passage 74 and working fluid from the core passage 62, or its variations as discussed above. In some forms the surface 106 forms a deck along which the exhaust flows. In one non-limiting embodiment the surface 106 is included to form a single expansion ramp nozzle.

Figure 4:
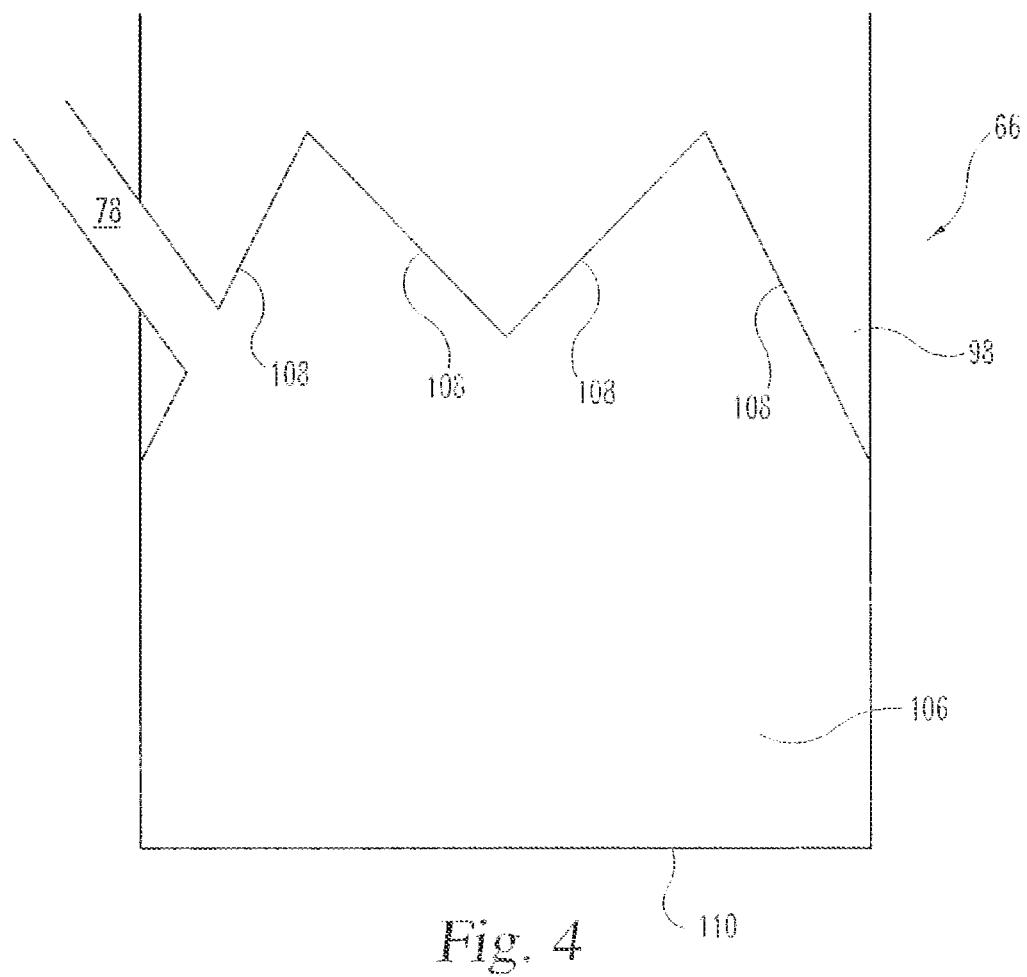
FIG. 4 depicts an embodiment of a nozzle.

Turning now to FIG. 4, a top view of the nozzle 66 is shown. The wall 98 is shown in which a downstream edge 108 includes a discontinuous shape. Though the illustrative embodiment depicts the downstream edge 108 as having the form of a serrated edge, in other embodiments the downstream edge 108 can take other forms whether discontinuous or continuous.

The flow surface 106 is also depicted and is shown as including a downstream edge 110 that is continuous in shape. Other embodiments can include a downstream edge 110 that has other shapes. In some forms the downstream edge 110 can mimic the downstream edge 108 of the wall 98. Either or both of the downstream edges 108 and 110 can mimic the form of an aircraft structure. For example, the aircraft 51 can include a structure having an edge or edges that are arranged at, or substantially at, the same angle as one of the edges 108 depicted in the figure.

The nozzle 66 can receive a flow of working fluid from the branch 78 through one of its walls. In the illustrated embodiment the working fluid is shown exiting in proximity to the downstream edge 108. Other configurations are also contemplated. The flow of working fluid exiting from the branch 78 can either flow through a fixed or variable area opening. The opening can be an elongated slot or other useful opening. The slot can be arranged normal to an engine reference axis, or at an angle thereto.

The deck 106 can receive flow from either the bypass passage 74 or from the branch 78 to provide cooling. In one form the deck 106 can receive flow and pass it through one or more apertures such as a slot or holes. The slot or holes can form, among other things, structural arrangements that provide effusion cooling. In some forms the holes and slots can be sized to provide a film of cooling air to the surface 106 of the deck. In still other embodiments the flow from either the bypass passage 74 and the branch 78 can provide backside convective cooling.

Figure 5A:
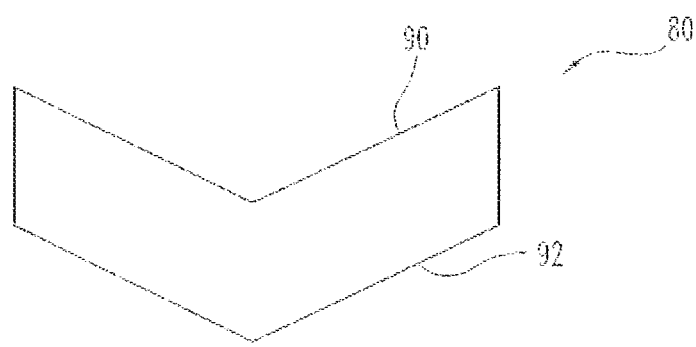
FIG. 5a depicts an embodiment of a nozzle member.
Figure 5B:
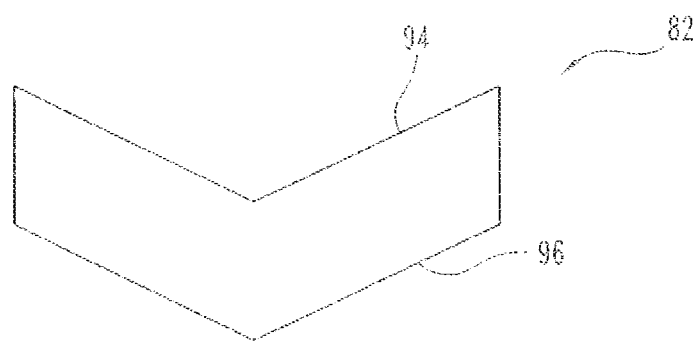
FIG. 5b depicts an embodiment of a nozzle member.

FIGS. 5a and 5b depict top profiles of the translatable members 80 and 82. Upstream sides 90 and 94, as well as downstream sides 92 and 96 of the illustrated embodiment include edges having discontinuous shapes. The shapes follow at least part of the form of the downstream edges 108 of the wall 98, but in other embodiments the shapes can take different forms. For example, the shapes of the sides 90-96 can be continuous. The sides can also follow contours other than the shapes of the downstream edges 108 of the wall 98.

Figure 6A:
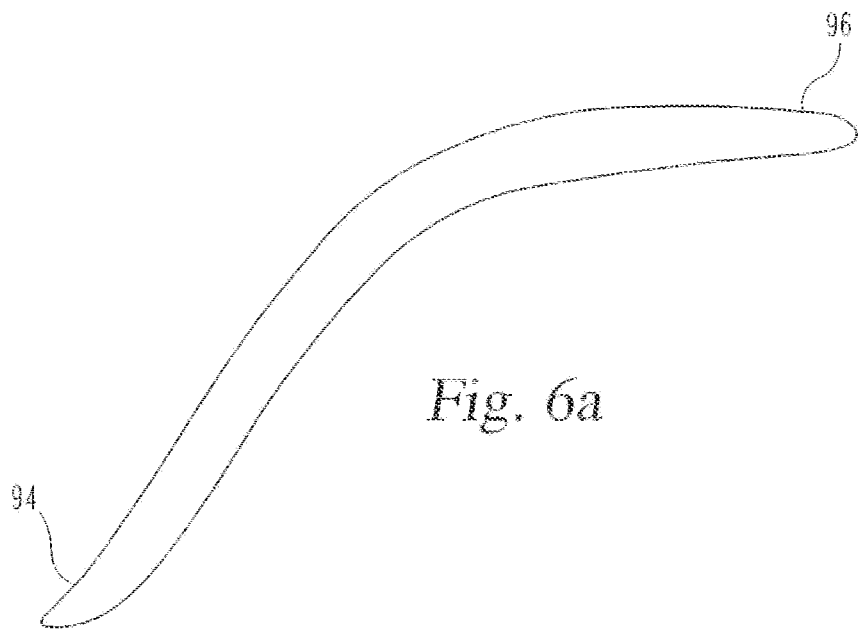
FIG. 6a depicts an embodiment of cross sectional variation of a nozzle member.
Figure 6B:
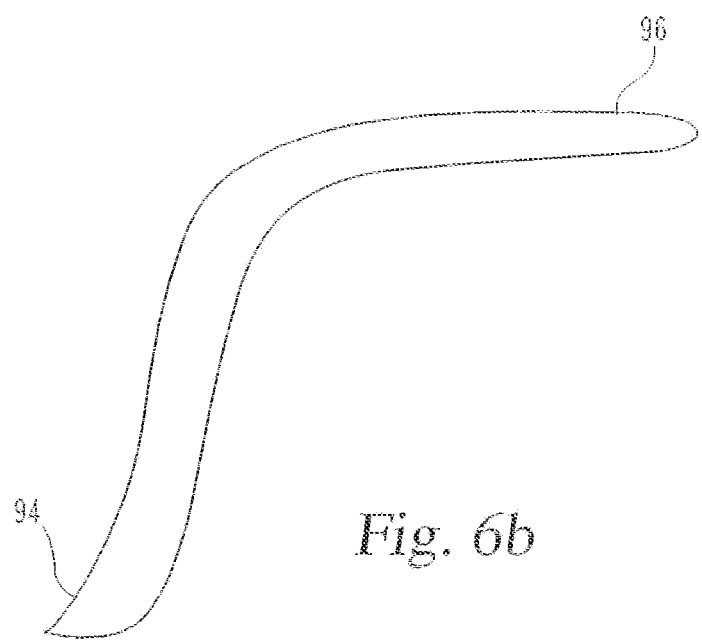
FIG. 6b depicts an embodiment of cross sectional variation of a nozzle member.

FIGS. 6a and 6b show cross sectional views of one embodiment of the member 82. The cross sectional views represent different butt line stations of the member 82. In one non-limiting example the cross section shown in FIG. 6a can represent a lateral side of the member 82 while the cross section shown in FIG. 6b can represent a median location, such as a center of the member 82. The variation of cross section can provide a shape of either or both the flow areas 100 and 102 that are tailored. For example, when the flow area 100 represents a throat area A8 of the nozzle 66 the variation in cross sectional shape of member 82 can provide a shape of throat area different than the shape represented by either members 80 and 82 as shown in FIGS. 5a and 5b. One embodiment of a throat shape different than the shape of the members 80 and 82 is discussed further below. Though the illustrated embodiment depicts a variation in cross sectional shape of the member 82, in some embodiments the member 82 can additionally and/or alternatively include a variation in cross sectional shape. In some embodiments a swept ejector slot can be provided.

Figure 7:
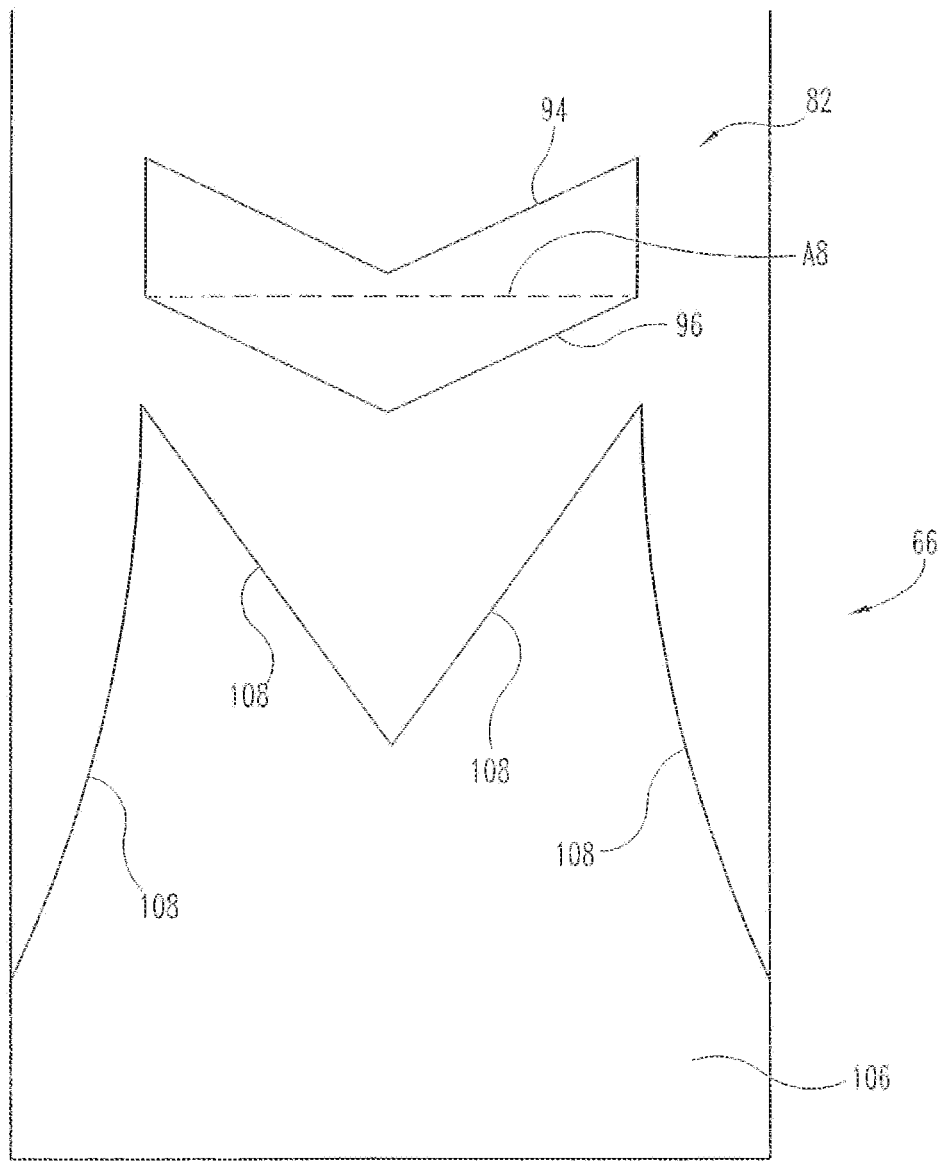
FIG. 7 depicts an embodiment of a nozzle and nozzle member.

FIG. 7 shows a throat A8 as a result of contoured shaping of the member 82. The throat A8 is shown as lying upon a line that is transverse to a flow of exhaust through the nozzle 66. The line is also not aligned with the sides 94 and 96 of the member 82. Though the throat A8 is shown as extending in a straight line, other shapes of extension are also contemplated. For example, the throat A8 may lie upon a convex or curvilinear line between sides of the nozzle 66. Any variety of other configurations are also contemplated within the scope of the instant application. Though the throat area A8 is discussed in this particular embodiment, similar configurations can also provide similar arrangements of the throat area A28.

As will be appreciated, given the description above certain modes of operation will be apparent. At cruise conditions, which can be subsonic, the engine 50 can be configured in an SFC mode in which the member 80 is placed in a relatively aft position while the member 82 is positioned to permit flow through the flow area 102. In a maximum power setting, no afterburning, setting, the member 80 can be placed in a relatively forward position and the member 82 positioned to close the flow area 102. In a maximum afterburning mode the member 80 can be placed relatively aft position and the member 82 positioned to either close the flow area 102 or open it slightly to provide for cooling. Other power settings and member positions are also contemplated herein.

An aspect of the present application includes an apparatus comprising a variable cycle gas turbine engine having a core flow passage and a bypass passage, and a nozzle oriented to merge the core flow passage and the bypass passage, the nozzle including a first slideable member and a second slideable member defining the core flow passage, the second slideable member also defining the bypass passage.

A feature of the present application includes wherein the bypass passage is a third stream bypass passage structured to withdraw a working fluid from a fan bypass passage.

Another feature of the present application includes wherein a portion of working fluid traversing the third stream bypass passage is split into a first branch bypass passage and a second branch bypass passage, the first branch bypass passage forming the bypass passage merged with the core flow passage in the nozzle.

Still another feature of the present application further includes an opening for discharge of working fluid from the third stream bypass passage into the nozzle upstream from an exit of the nozzle.

Yet still another feature of the present application includes wherein the opening is formed on a lateral side of the nozzle.

Still yet another feature of the present application includes wherein the nozzle receives a merged flow from the core flow passage and a fan bypass passage, the first slideable member and the second slideable member defining a merged flow passage from the core flow passage and the fan bypass passage.

A further feature of the present application includes wherein the fan bypass passage is annular.

A still further feature of the present application includes wherein the third stream bypass passage is an annular passage at an upstream portion of the variable cycle gas turbine engine, and wherein the third stream bypass passage is split to transition from the annular passage to an underslung passage.

Yet a still further feature of the present application further includes an third stream bypass passage, the nozzle oriented to merge the core flow passage and the fan bypass passage.

Still yet a further feature of the present application includes wherein the first slideable member is disposed on one side of the core flow passage and the second slideable member is disposed on another side of the core flow passage.

Yet another feature of the present application includes wherein the core flow passage and fan bypass passage are coaxial at an upstream location of the gas turbine engine, wherein the fan bypass passage is unwrapped from the coaxial axis between the upstream location and the nozzle such that the bypass passage is laterally displaced from the core flow passage.

Still yet another feature of the present application further includes a heat exchanger disposed in the bypass passage.

Another feature of the present application includes wherein the second slideable member includes a contour that changes as a function of butt line.

A still further feature of the present application includes wherein the trailing edge of the second slideable member is at an angle relative to a reference line of the gas turbine engine.

Still another feature of the present application includes wherein the trailing edge of the second slideable member includes a first portion at a first angle to a reference line of the gas turbine engine and an opposing second portion at a second angle to the reference line.

Yet still another feature of the present application includes wherein a throat of the bypass passage is defined by the second slideable member, and wherein the throat has a contour different than a trailing edge of the second slideable member.

Still yet another feature of the present application includes wherein a throat of the bypass passage is defined by the second slideable member, and wherein the throat has a contour different than a trailing edge of an exit of the nozzle.

Another aspect of the present application includes an apparatus comprising a gas turbine engine having a core flow passage, annular shaped third stream bypass passage unwrapped from coaxial axis and ducted to an underslung configuration, a branch of the ducted third stream bypass configured to withdraw working fluid from the third stream bypass passage downstream of the unwrap location; a nozzle that receives a working fluid from the core flow passage and from the third stream bypass passage, the nozzle configurable to change a flow area of the core flow passage and a flow area of the third stream bypass passage by movement of a first member and second member.

A feature of the present application includes wherein the core flow passage includes a flow from a core of the gas turbine engine and from a turbofan of the gas turbine engine.

Still another feature of the present application includes wherein the first member is configured to be slideably moveable from an open position to a closed position.

Yet still another feature of the present application includes wherein the first member is slideably moveable along an axis that is at an angle relative to an axis that the second member is slideably moveable along.

Still yet another feature of the present application includes wherein the core flow passage is defined between the first member and the second member.

A further feature of the present application includes wherein the third stream bypass passage is defined between a fixed portion of the nozzle and the second member.

A still further feature of the present application includes wherein the nozzle receives a first branch flow from the third stream bypass passage and a second branch flow from the third stream bypass passage, the first branch flow traversing the changeable flow area of the third stream bypass passage.

A yet still further feature of the present application includes wherein the second branch flow from the third stream bypass passage is received in the nozzle through an opening.

Yet another feature of the present application includes wherein a heat exchanger is disposed within the second branch.

Still yet another feature of the present application includes wherein the opening is through a lateral wall of the nozzle.

Yet still another feature of the present application includes wherein the opening is through a deck of the nozzle.

A yet further feature of the present application includes wherein the nozzle includes a single expansion ramp nozzle.

Yet another feature of the present application further includes a split and re-merge of flow between upstream and downstream end of fan flow passage.

Still yet another feature of the present application includes wherein the nozzle includes an outlet having a non-linear downstream edge.

A further feature of the present application includes wherein the non-linear downstream edge includes a first edge and a second edge disposed at an angle relative to each other.

A still further feature of the present application includes wherein at least one of the first member and second member includes a downstream edge parallel to the downstream edge of the nozzle.

A yet further feature of the present application includes wherein the flow area of the core flow passage includes a throat of the core flow passage, the throat extending between side walls of the nozzle in a configuration different from the downstream edge of the nozzle.

Still another feature of the present application includes wherein at least one of the first member and second member include a cross section that varies laterally between side walls of the nozzle.

Yet another aspect of the present application provides a method comprising operating a gas turbine engine having a core flow path and a bypass path, ducting the bypass path from an annular passage to an laterally displaced passage that extends partially around the gas turbine engine, and sliding a first nozzle member to change a first nozzle flow area through which a working fluid from the core flow path traverses.

A feature of the present application further includes withdrawing a third stream bypass from a fan bypass of the gas turbine engine.

Another feature of the present application further includes sliding a second nozzle member to change a second nozzle flow area through which a working fluid from the bypass path traverses.

Still another feature of the present application includes wherein the first nozzle area through which the working fluid from the core flow path traverses is also changed by movement of the second nozzle member.

Yet still another feature of the present application includes wherein the bypass path includes a first branch of a third stream bypass path, a second branch of the third stream bypass path routed to a separate location in the nozzle.

Still yet another feature of the present application further includes exchanging heat between a working fluid in the second branch of the third stream bypass path with a heat exchanger in thermal communication with a component.

Yet still another feature of the present application further includes moving the first nozzle member from a forward position to a rearward position when the gas turbine engine is transitioned between a cruise mode and a max thrust mode.

Still yet another feature of the present application further includes actuating the first nozzle member to slide from a rearward position to a forward position when the gas turbine engine is requested to transition from a dry thrust mode to an afterburning mode.

Yet a further feature of the present application further includes opening the second nozzle flow area during an afterburning mode.

Still yet a further feature of the present application includes wherein the opening of the second nozzle flow area occurs when the second nozzle member slides within a plane oriented at an angle to an axial axis of the gas turbine engine Yet still a further feature of the present application further includes converging a flow of working fluid through a throat that extends in a different direction than an exit edge of the nozzle.

Yet another feature of the present application further includes cooling a deck of the nozzle using a working fluid from the bypass path.

Still another aspect of the present application includes an apparatus comprising a variable cycle gas turbine engine having a core flow passage, a fan bypass passage, and a third stream bypass passage, and a nozzle oriented to merge the core flow passage and the third stream bypass passage, the nozzle including a first slideable member and a second slideable member defining the core flow passage, the second slideable member also defining the bypass passage.

A feature of the present application includes wherein a portion of working fluid traversing the third stream bypass passage is split into a first branch bypass passage and a second branch bypass passage, the first branch bypass passage forming the bypass passage merged with the core flow passage in the nozzle.

Another feature of the present application includes wherein the nozzle receives a merged flow from the core flow passage and a fan bypass passage, the first slideable member and the second slideable member defining a merged flow passage from the core flow passage and the fan bypass passage.

Still another feature of the present application includes wherein the third stream bypass passage is an annular passage at an upstream portion of the variable cycle gas turbine engine, and wherein the third stream bypass passage is split to transition from the annular passage to an underslung passage.

Yet still another feature of the present application further includes a heat exchanger disposed in the third stream bypass passage.

Still yet another feature of the present application includes wherein the second slideable member includes a contour that changes as a function of butt line.

A further feature of the present application includes wherein a trailing edge of the second slideable member includes a first portion at a first angle to a reference line of the gas turbine engine and an opposing second portion at a second angle to the reference line.

A still further feature of the present application includes wherein a throat of the third stream bypass passage is defined by the second slideable member, and wherein the throat has a contour different than a trailing edge of the second slideable member.

A still further feature of the present application includes wherein the throat has a contour different than a trailing edge of an exit of the nozzle.

A further aspect of the present application includes an apparatus comprising a gas turbine engine having a core flow passage, an annular shaped third stream bypass passage unwrapped from coaxial axis and ducted to an underslung configuration, a branch of the third stream bypass passage configured to withdraw working fluid from the third stream bypass passage downstream of the unwrap location, and a nozzle that receives a working fluid from the core flow passage and from the third stream bypass passage, the nozzle configurable to change a flow area of the core flow passage and a flow area of the third stream bypass passage by movement of a first member and second member.

A feature of the present application includes wherein the first member is slideably moveable along an axis that is at an angle relative to an axis that the second member is slideably moveable along.

Another feature of the present application includes wherein the core flow passage is defined between the first member and the second member, and wherein the third stream bypass passage is defined between a fixed portion of the nozzle and the second member.

Still another feature of the present application includes wherein the nozzle receives a first branch flow from the third stream bypass passage and a second branch flow from the third stream bypass passage.

Yet still another feature of the present application includes wherein a heat exchanger is disposed within a second branch.

Still yet another feature of the present application includes wherein the first branch flow is received into the nozzle through a lateral wall of the nozzle.

Yet still another feature of the present application includes wherein the first branch flow is received into the nozzle through a deck of the nozzle.

A further feature of the present application includes wherein the nozzle includes a single expansion ramp nozzle.

A yet further feature of the present application includes wherein the nozzle includes a first edge and a second edge disposed at an angle relative to each other.

A still further feature of the present application includes wherein at least one of the first member and second member include a cross section that varies laterally between side walls of the nozzle.

Still a yet further aspect of the present application includes a method comprising operating a gas turbine engine having a core flow path and a bypass path, withdrawing a third stream bypass from a fan bypass of the gas turbine engine, ducting the third stream bypass from an annular passage to an laterally displaced passage that extends partially around the gas turbine engine, and sliding a first nozzle member to change a first nozzle flow area through which a working fluid from the core flow path traverses.

A feature of the present application further includes sliding a second nozzle member to change a second nozzle flow area through which a working fluid from the bypass path traverses.

Another feature of the present application includes wherein the first nozzle flow area through which the working fluid from the core flow path traverses is also changed by movement of the second nozzle member.

Still another feature of the present application includes wherein the third stream bypass includes a first branch and a second branch routed to separate locations in the nozzle.

Yet still another feature of the present application further includes exchanging heat between a working fluid in the second branch of the third stream bypass with a heat exchanger in thermal communication with a component.

Still yet another feature of the present application further includes moving the first nozzle member from a forward position to a rearward position when the gas turbine engine is transitioned between a cruise mode and a max thrust mode.

Yet still another feature of the present application further includes actuating the first nozzle member to slide from a rearward position to a forward position when the gas turbine engine is requested to transition from a dry thrust mode to an afterburning mode.

Still yet another feature of the present application further includes opening a second nozzle flow area during the afterburning mode, and wherein the opening of the second nozzle flow area occurs when the second nozzle member slides within a plane oriented at an angle to an axial axis of the gas turbine engine.

An aspect of the present application provides an apparatus comprising a variable cycle gas turbine engine having a core flow passage, a fan bypass passage, and a third stream bypass passage, and a nozzle oriented to merge the core flow passage and the third stream bypass passage, the nozzle including a first slideable member and a second slideable member defining a first flow area through which passes flow from the core flow passage, the second slideable member also defining a third stream flow area of the third stream bypass passage, wherein the second slideable member is capable of changing a flow area of both the first flow area and the third stream flow area.

A feature of the present application further provides wherein a portion of working fluid traversing the third stream bypass passage is split into a first branch bypass passage and a second branch bypass passage, the first branch bypass passage forming the bypass passage merged with the core flow passage in the nozzle.

Another feature of the present application further provides wherein the nozzle receives a merged flow from the core flow passage and a fan bypass passage, the first slideable member and the second slideable member defining a merged flow passage from the core flow passage and the fan bypass passage.

Still another feature of the present application further provides wherein the third stream bypass passage is an annular passage at an upstream portion of the variable cycle gas turbine engine, and wherein the third stream bypass passage is split to transition from the annular passage to an underslung passage.

Yet still another feature of the present application further provides a heat exchanger disposed in the third stream bypass passage.

Still yet another feature of the present application further provides wherein the second slideable member includes a contour that changes as a function of butt line.

A further feature of the present application further provides wherein a trailing edge of the second slideable member includes a first portion at a first angle to a reference line of the gas turbine engine and an opposing second portion at a second angle to the reference line.

Still a further feature of the present application further provides wherein a throat of the third stream bypass passage is defined by the second slideable member, and wherein the throat has a contour different than a trailing edge of the second slideable member.

Yet still a further feature of the present application further provides wherein the throat has a contour different than a trailing edge of an exit of the nozzle.

Another aspect of the present application provides an apparatus comprising a gas turbine engine having a core flow passage and a fan bypass passage that together are merged into a merged flow passage, an annular shaped third stream bypass passage unwrapped from coaxial axis and ducted to an underslung configuration to form a third stream nozzle passage, and a nozzle that receives the merged flow passage and the third stream nozzle passage, the nozzle having a dual-use moveable member disposed between the merged flow passage and the third stream nozzle passage and structured to dependently change an area of the merged flow passage and the third stream nozzle passage whereby movement of the dual-use moveable member can increase a flow area of the merged flow passage while it decreases a flow area of the third stream nozzle passage.

A feature of the present application further provides a single-use moveable member that defines the merged flow passage.

Another feature of the present application further provides wherein the single-use moveable member and the dual-use moveable member can together define a flow are of the merged flow passage, and wherein the dual-use moveable member is translatable along an axis.

Still another feature of the present application further provides wherein the single-use moveable member is translatable between a relatively open position and a relatively closed position.

Yet still another feature of the present application further provides wherein the dual-use moveable member is translatingly moveable along an axis of extension.

Still yet another feature of the present application further provides wherein the dual-use moveable member includes a cross section that varies with butt-line, and wherein the axis of extension that the dual-use moveable member is translatingly moveable is disposed at an angle to an axis of extension over which the single-use moveable member is translatable.

A further feature of the present application further provides wherein the single-use moveable member is translat-able along a first axis that is oriented at an angle to an axis along which the dual-use moveable member is translatable.

A still further feature of the present application further provides wherein the nozzle includes a single expansion ramp nozzle.

Yet still a further feature of the present application further includes a third stream branch that receives working fluid from the annular shaped third stream bypass passage separate from the working fluid received in the third stream nozzle passage.

Still another feature of the present application further provides wherein the third stream branch delivers its working fluid to the nozzle downstream of the dual-use moveable member.

Another aspect of the present application provides a method comprising operating a gas turbine engine having a core flow path, a bypass path, and a third stream bypass path, ducting the third stream bypass path from an annular-shaped passage to a laterally displaced passage that extends partially around the gas turbine engine, and moving a first nozzle member to change a first nozzle flow area through which a working fluid from the core flow path traverses, and adjusting a second nozzle member in a different manner than the moving to alter a third stream area through which a working fluid from the third stream passes, and merging the working fluid from the core flow path with the working fluid from the third stream.

A feature of the present application further provides wherein the adjusting includes sliding the second nozzle member to alter the third stream flow area.

Another feature of the present application further provides wherein the first nozzle flow area through which the working fluid from the core flow path traverses is also changed by the adjusting of the second nozzle member.

Still another feature of the present application further provides wherein the different manner includes sliding the second nozzle member in a non-coincident manner to the moving the first nozzle member, and wherein the third stream bypass path includes a first branch and a second branch routed to separate locations in a nozzle that includes the first nozzle member and the second nozzle member.

Yet still another feature of the present application further includes exchanging heat between a working fluid in a branch of the third stream bypass path with a heat exchanger in thermal communication with a component.

Still yet another feature of the present application further includes moving the first nozzle member from a forward position to a rearward position when the gas turbine engine is transitioned between a cruise mode and a max thrust mode.

A further feature of the present application further includes actuating the first nozzle member to slide from a rearward position to a forward position when the gas turbine engine is requested to transition from a dry thrust mode to an afterburning mode.

Still another feature of the present application further includes opening a second nozzle flow area during the afterburning mode, and wherein the opening of the second nozzle flow area occurs when the second nozzle member slides within a plane oriented at an angle to an axial axis of the gas turbine engine.

Still another aspect of the present application provides an apparatus comprising a gas turbine engine having a core flow passage, fan bypass passage, and a third stream bypass passage, a branch of the third stream bypass passage configured to withdraw working fluid from the third stream bypass passage and extending downstream from a branch point, the branch of the third stream passage forming a separate flow path from the third stream passage, the branch of the third stream passage configured to have attenuated fluctuations in flow rate relative to fluctuations in flow rate of the third stream bypass passage at a location downstream of the branch point, a nozzle that receives a working fluid from a merger of the core flow passage and the fan bypass passage as well as a working fluid from the third stream bypass passage, the nozzle configurable to change a flow area of the merger of the core flow passage and fan bypass passage, and a heat exchanger located in the branch such that the relatively consistent flow rate of working fluid through the branch is used to exchange heat with the heat exchanger.

A feature of the present application provides wherein a heat exchanger is disposed within the branch of the third stream bypass passage.

Another feature of the present application provides wherein the nozzle receives a first branch flow from the third stream bypass passage and a second branch flow from the third stream bypass passage.

Still another feature of the present application provides wherein the third stream bypass passage includes an annular configuration that is unwrapped from coaxial axis and ducted to an underslung configuration.

Still yet another feature of the present application provides wherein flow from the branch is received into the nozzle through a lateral wall of the nozzle.

Yet still another feature of the present application provides wherein the first branch flow is received into the nozzle through a deck of the nozzle.

A further feature of the present application provides wherein the nozzle is also configurable to change a flow are of the third stream bypass passage.

A still further feature of the present application provides wherein the nozzle includes a single expansion ramp nozzle, wherein the flow area of the merger of the core flow passage and the fan bypass passage as well as the flow area of the third stream bypass passage is via movement of a first member, and which further includes a second member used to change a flow area of the core flow passage, and wherein the first member is slideably moveable along an axis that is at an angle relative to an axis that the second member is slideably moveable along.

A yet still further feature of the present application provides wherein the nozzle includes a serrated exit surface, and wherein the third stream bypass passage is defined between a fixed portion of the nozzle and the second member.

Still yet a further feature of the present application further includes a first nozzle member and a second nozzle member, and wherein at least one of the first nozzle member and second nozzle member include a cross section that varies laterally between side walls of the nozzle.

Yet another aspect of the present application provides an apparatus comprising a gas turbine engine having a core flow passage and a fan bypass passage, a third stream bypass passage having an annular configuration at an upstream location, a split in the annular configuration at a location intermediate an upstream position of the third stream bypass passage and a downstream location of the third stream bypass passage such that the third stream bypass passage is radially displaced to the side of the core flow passage downstream of the split, a flow partition located in the third stream bypass passage structured to form a nozzle path of the third stream bypass passage and a utility path of the third stream bypass passage, a nozzle that receives a working fluid from the core flow passage, the fan bypass passage, and from the nozzle path of the third stream bypass passage, and wherein the utility path of the third stream bypass passage is configured to accommodate a thermodynamic device structured to thermodynamically alter a working fluid flowing through the second branch.

A feature of the present application provides wherein the flow partition located downstream of the split in the annular configuration.

Another feature of the present application provides wherein the thermodynamic device is a heat exchanger.

Still another feature of the present application provides wherein the utility path of the third stream bypass passage is structured to maintain a relatively consistent flow rate over a range of engine operating conditions in comparison to a flow rate of working fluid through the nozzle path.

Yet still another feature of the present application provides wherein the flow rate of working fluid through the nozzle path can include a rate that results from closing the nozzle path.

Still yet another feature of the present application further includes a second utility path of the third stream bypass passage.

A further feature of the present application provides wherein the nozzle includes a first slidable member defining a merger of the core flow passage and the fan bypass passage, and a second slidable member defining the merger.

Still another aspect of the present application provides a method comprising operating a gas turbine engine having a core flow path and a fan bypass path, flowing a working fluid through a third stream bypass passage, branching a path from the third stream bypass passage, maintaining a relatively constant flow rate of working fluid through the branch, and transferring energy between the relatively constant flow rate through the branch and a thermodynamic device disposed within the branch.

A feature of the present application further includes actuating a moveable member that can vary a flow area of the third stream bypass passage and thereby affect the flow rate of the working fluid.

Another feature of the present application further includes ducting working fluid from an annular configuration in the third stream bypass passage to a laterally displaced configuration in the third stream bypass passage.

Still another feature of the present application provides wherein the thermodynamic device is a heat exchanger, and wherein the actuating the moveable member also varies a flow area of a merged flow passage that includes the core flow path and the bypass flow path.

Yet still another feature of the present application further includes moving a second moveable member to alter a flow area of the merged flow passage.

Another aspect the present application provides an apparatus comprising a gas turbine engine having a core flow passage and a rotatable turbomachinery component that operates upon working fluid in a bypass passage, the bypass passage having a branch configured to convey a portion of working fluid traversing the bypass passage and a variable geometry flow mechanism configured to change a flow area, the variable geometry flow mechanism capable of being commanded at different engine power settings by a controller to a configuration that provides for attenuated fluctuations in flow rate within the branch relative to variations in flow rate provided by the different engine power settings of any remaining working fluid in the bypass passage that is not conveyed by the branch, and a utility device located in thermodynamic communication with the working fluid conveyed through the branch such that the relatively consistent flow rate of working fluid through the branch is used to exchange energy with the utility device.

A feature of the present application provides wherein the variable geometry flow mechanism is coupled with the bypass passage to change the flow area of the bypass passage.

Another feature of the present application provides wherein a flow area of the branch can be changed as a result of a command provided by the controller, and wherein the variable geometry flow mechanism is translatingly moved from a first position to a second position upon receipt of a command from the controller.

Still another feature of the present application further includes another variable geometry flow mechanism coupled with the branch, wherein the bypass passage is a third stream bypass passage of a turbofan engine, and wherein the rotatable turbomachinery component provides working fluid for both the core flow passage and the bypass passage.

Yet still another feature of the present application provides wherein the utility device is a heat exchanger having a thermal member exposed to working fluid within the branch of the bypass passage, wherein the variable geometry flow mechanism is moved along an axis as it changes the flow area, and wherein the controller receives information derived from a sensor to assist in determining a command for the variable geometry flow mechanism.

Still yet another feature of the present application provides wherein the gas turbine engine includes a fan bypass passage, wherein the bypass passage is a third stream bypass passage, and wherein the core flow passage and the fan bypass passage are merged.

A further feature of the present application provides wherein the third stream bypass passage is configurable such that a flow area of the third stream bypass passage can be changed, and wherein a common nozzle is structured to receive working fluid from the core flow passage, fan bypass passage, and third stream bypass passage.

Still a further feature of the present application provides wherein a flow area of the merged core flow passage and fan bypass passage as well as the flow area of the third stream bypass passage is via movement of the variable geometry flow mechanism, and which further includes another variable geometry flow mechanism used to change flow area of the merged core flow passage and fan bypass passage, and wherein the variable geometry flow mechanism is slideably moveable along an axis that is at an angle relative to an axis that the another variable geometry flow mechanism is slideably moveable along.

Yet still a further feature of the present application provides wherein a common nozzle includes the variable geometry flow mechanism and the another variable geometry flow mechanism, and wherein the common nozzle is also structured to receive working fluid from the branch.

Still yet a further feature of the present application provides wherein the branch includes a branch variable geometry flow mechanism structured to change a flow area of the branch.

Yet still another feature of the present application provides wherein the variable geometry flow mechanism includes a first nozzle member and the another variable geometry flow mechanism includes a second nozzle member, and wherein at least one of the first nozzle member and second nozzle member include a cross section that varies laterally between side walls of a common nozzle structured to flow both the third stream bypass passage and the merged core flow passage and fan bypass passage.

Yet another aspect of the present application provides an apparatus comprising a gas turbine engine having a core flow passage and a bypass passage that is located downstream of a rotatable bladed component, a flow partition located in the bypass passage structured to form a first path of the bypass passage and a utility path of the bypass passage, a variable geometry device coupled with one of the first path of the bypass passage and the utility path of the bypass passage, the variable geometry device responsive to changes in operating condition of the gas turbine engine such that the variable geometry device provides a substantially constant flow rate of working fluid through the utility path of the bypass passage over a range of operating conditions of the gas turbine engine, and wherein the utility path of the bypass passage is configured to accommodate a thermodynamic device structured to thermodynamically alter a working fluid flowing through the utility path.

A feature of the present application provides wherein the variable geometry device is coupled with the first path of the bypass passage and is structured to change a flow area of the first path of the bypass passage.

Another feature of the present application provides wherein the rotatable bladed component provides working fluid to both the core flow passage and the bypass passage.

Still another feature of the present application provides wherein the gas turbine engine is a turbofan engine, wherein the bypass passage is a third stream bypass passage, and wherein the thermodynamic device is a heat exchanger.

Yet still another feature of the present application provides wherein the third stream bypass passage is an annular offtake from a fan bypass passage of the turbofan engine, and wherein the flow partition is situated to circumferentially split working fluid flowing in the third stream bypass passage.

A further feature of the present application provides wherein the annular shaped third stream bypass passage further includes a split located upstream of the flow partition, the third stream bypass passage including a transition region downstream of the split that ducts the third stream bypass passage into a radially displaced passage relative to the core flow passage.

A still further feature of the present application further includes a controller structured to receive a signal used to determine a command to the variable geometry device, the controller operable to generate a command signal for use by an actuation device, and wherein the utility path is coupled with another variable geometry device structured to change a flow area of the utility path.

Yet a still further feature of the present application further includes a nozzle through which passages core flow of the gas turbine engine.

Yet another feature of the present application provides wherein the nozzle is further structured to receive working fluid from a fan bypass passage of the gas turbine engine, and wherein the bypass passage is a third stream bypass passage.

Still yet another feature of the present application provides wherein the nozzle is further structured to receive working fluid from the third stream bypass passage, and which further includes a fan and core variable geometry device configured to change a flow area of a merged flow passage between the fan bypass passage and the core flow passage.

A further feature of the present application provides wherein the variable geometry device is operable to change flow area of both the third stream bypass passage and the merged flow passage, and wherein the nozzle is structured to receive working fluid from the utility path of the bypass passage.

Still yet another aspect of the present application provides a method comprising operating a gas turbine engine having a core flow path and a bypass path to convey working fluid through the bypass path, branching working fluid from the bypass path to form a flow of working fluid in a branch path, transferring an energy between the flow of working fluid through the branch path and a thermodynamic device disposed in communication with the branch path, and changing a flow area of at least one of the bypass path and the branch path as a result of a change in operating condition of the gas turbine engine, the changing in response to maintaining a flow rate of working fluid through the branch path that is adequate for the transferring.

A feature of the present application provides wherein the changing a flow area includes actuating a moveable member that can vary a flow area of the bypass path.

Another feature of the present application provides wherein the bypass path is a third stream bypass path, and wherein the gas turbine engine further includes a fan bypass path, and wherein the changing affects a flow area of the third stream bypass path.

Still another feature of the present application provides wherein the thermodynamic device is a heat exchanger, and which further includes altering a flow area of the branch path from the third stream bypass path.

Yet still another feature of the present application further includes merging the third stream bypass path, core flow path, and fan bypass path in a common nozzle.

A further feature of the present application provides wherein the merging further includes directing the branch path of the third stream bypass path to be received by the common nozzle.

Still yet another aspect of the present application provides an apparatus comprising a gas turbine engine having a core flow passage and a rotatable turbomachinery component that operates upon working fluid in a bypass passage, the bypass passage having a branch configured to convey a portion of working fluid traversing the bypass passage and a variable geometry flow mechanism configured to change a flow area, the variable geometry flow mechanism capable of being commanded at different engine power settings by a controller to a configuration that provides for a utility flow rate within the branch, and a utility device located in thermodynamic communication with the working fluid conveyed through the branch such that the working fluid exchanges energy with the utility device, the utility flow rate a function of an energy exchange requirement of the utility device.

Yet still another aspect of the present application provides an apparatus comprising a gas turbine engine having a core flow passage and a bypass passage that is located downstream of a rotatable bladed component, a flow partition located in the bypass passage structured to form a first path of the bypass passage and a utility path of the bypass passage, a variable geometry device coupled with one of the first path of the bypass passage and the utility path of the bypass passage, wherein the utility path of the bypass passage is configured to accommodate a thermodynamic device structured to thermodynamically alter a working fluid flowing within the utility path, and wherein the variable geometry device responsive to changes in operating condition of the gas turbine engine such that the variable geometry device is set at a configuration to accommodate a demand for energy exchange over a range of operating conditions of the gas turbine engine and demand of the thermodynamic device.

Still another aspect of the present application provides an apparatus comprising a gas turbine engine having a core flow passage, a fan bypass passage, and a third stream bypass passage that is split from the fan bypass passage, the third stream bypass passage having a branch configured to convey a portion of working fluid traversing the third stream bypass passage, and a heat exchanger located in thermal communication with the working fluid conveyed through the branch of the third stream bypass passage such that the working fluid exchanges heat with the heat exchanger.

A feature of the present application further includes a variable geometry flow mechanism configured to change a flow area of the third stream bypass passage, the variable geometry flow mechanism capable of being commanded at different engine power settings by a controller to a configuration that provides for a utility flow rate within the branch, the utility flow rate a function of a heat exchange requirement of the heat exchanger.

Another feature of the present application provides wherein the variable geometry flow mechanism is configured to change the flow area of the branch.

Still another feature of the present application provides wherein the variable geometry flow mechanism is configured to change the flow area of the third stream bypass passage separate from the branch at a location downstream of a branch point that begins the branch.

Yet still another feature of the present application provides wherein the branch includes a fixed geometry such that it remains in the same configuration throughout the branch during operation of the gas turbine engine.

Still yet another feature of the present application provides wherein the third stream bypass passage that conveys working fluid that is not routed through the branch includes a fixed geometry such that it remains in a static configuration.

A further feature of the present application provides wherein the heat exchanger is located at an upstream end of the branch.

Yet a further feature of the present application provides wherein the third stream bypass passage includes an exit set apart from an exit of the fan bypass passage.

Still yet a further feature of the present application provides wherein the third stream bypass passage includes a discharge location that is within a region of influence of a discharge location associated with the fan bypass passage.

Another aspect of the present application provides an apparatus comprising a turbofan engine having a core flow passage, a fan bypass passage, and a third stream bypass passage that is located downstream of a rotatable bladed component, a flow partition located in the third stream bypass passage structured to form a first path of the third stream bypass passage and a utility path of the third stream bypass passage, and wherein the utility path of the third stream bypass passage is configured to accommodate a heat exchanger structured to thermally alter a working fluid flowing within the utility path.

A feature of the present application further includes a variable geometry device coupled with one of the first path of the third stream bypass passage and the utility path of the third stream bypass passage.

Another feature of the present application provides wherein the variable geometry device is coupled with both of the first path and the utility path.

Still another feature of the present application provides wherein the first path has a fixed end in proximity to an exit of the first path.

Yet still another feature of the present application provides wherein the utility path has a fixed end in proximity to an exit of the utility path.

Still yet another feature of the present application provides wherein the variable geometry device is responsive to changes in operating condition of the gas turbine engine such that the variable geometry device is set at a configuration to provide a flow rate that accommodates a demand for heat exchange between the heat exchanger and the working fluid flowing in the utility path over a range of operating conditions of the gas turbine engine.

A further feature of the present application provides wherein the heat exchanger is located upstream from an exit of the utility path of the third stream bypass passage.

A still further feature of the present application provides wherein an exit of the utility path and an exit of the first path of the third stream bypass passage are distinct exits to an external space and that are located apart from each other.

A yet still further feature of the present application provides wherein working fluid discharged from the utility path is influenced by working fluid discharged from the first path of the third stream bypass passage Still yet another aspect of the present application provides a method comprising operating a gas turbine engine having a core flow path, a fan bypass path, and a third stream bypass path to convey working fluid through the third stream bypass path, branching working fluid from the third stream bypass path to form a flow of working fluid in a branch path, and transferring an energy between the flow of working fluid through the branch path and a heat exchanger disposed in communication with the branch path.

A feature of the present application further includes changing a flow area of at least one of the third stream bypass path and the branch path as a result of a change in operating condition of the gas turbine engine, the changing in response to maintaining a flow rate of working fluid through the branch path that is adequate for the transferring.

Another feature of the present application further includes discharging working fluid from the third stream bypass path and working fluid in the branch path to an external location in a manner in which the discharging mutually influences each of the working fluid in the third stream bypass path and the branch path.

Still another feature of the present application provides wherein working fluid exiting the third stream bypass path and the branch path are through independent exits.

Yet still another feature of the present application further includes flowing working fluid through a fixed downstream end of at least one of the third stream bypass path and the branch path.

A further feature of the present application provides wherein the flowing is through a fixed downstream end of both the third stream bypass path and the branch path.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus comprising:
   a gas turbine engine having a core flow passage and a fan bypass passage that together are merged into a merged flow passage;
   an annular shaped third stream bypass passage at a proximal end of the apparatus which is unwrapped from a coaxial axis with the merged flow passage and ducted to an underslung configuration to form a third stream nozzle passage at a distal end of the apparatus; and
   a nozzle that receives the merged flow passage and the third stream nozzle passage, the nozzle having a dual-use moveable member disposed between the merged flow passage and the third stream nozzle passage and structured to change an area of the merged flow passage and the third stream nozzle passage whereby movement of the dual-use moveable member increases a flow area of the merged flow passage while it decreases a flow area of the third stream nozzle passage.

2. The apparatus according to claim 1, which further includes a single-use moveable member that defines the merged flow passage.

3. The apparatus according to claim 2, wherein the single-use moveable member and the dual-use moveable member can together define a flow area of the merged flow passage, and wherein the dual-use moveable member is translatable along an axis.

4. The apparatus according to claim 2, wherein the single-use moveable member is translatable between a relatively open position and a relatively closed position.

5. The apparatus according to claim 4, wherein the dual-use moveable member is translatingly moveable along an axis of extension.

6. The apparatus according to claim 5, wherein the dual-use moveable member includes a cross section that varies with butt-line, and wherein the axis of extension that the dual-use moveable member is translatingly moveable is disposed at an angle to an axis of extension over which the single-use moveable member is translatable.

7. The apparatus according to claim 2, wherein the single-use moveable member is translatable along a first axis that is oriented at an angle to an axis along which the dual-use moveable member is translatable.

8. The apparatus according to claim 7, wherein the nozzle includes a single expansion ramp nozzle.

9. The apparatus according to claim 1, which further includes a third stream branch that receives working fluid from the annular shaped third stream bypass passage.

10. The apparatus according to claim 9, wherein the third stream branch delivers its working fluid to the nozzle downstream of the dual-use moveable member.

11. An apparatus comprising:
    a variable cycle gas turbine engine having a core flow passage and a third stream bypass passage; and
    a nozzle oriented to merge the core flow passage and the third stream bypass passage, the nozzle including a first slideable member and a second slideable member defining a first flow area through which passes flow from the core flow passage, the second slideable member also defining a third stream flow area of the third stream bypass passage, wherein the second slideable member is capable of increasing a flow area of the first flow area while decreasing the third stream flow area.

12. The apparatus according to claim 11, wherein a portion of working fluid traversing the third stream bypass passage is split into a first branch bypass passage and a second branch bypass passage, the first branch bypass passage forming the third stream bypass passage merged with the core flow passage in the nozzle.

13. The apparatus according to claim 11, wherein the nozzle receives a merged flow from the core flow passage and a third stream bypass passage, the first slideable member and the second slideable member defining a merged flow passage from the core flow passage and the third stream bypass passage.

14. The apparatus according to claim 13, wherein the third stream bypass passage is an annular passage at an upstream portion of the variable cycle gas turbine engine, and wherein the third stream bypass passage is split to transition from the annular passage to an underslung passage.

15. The apparatus according to claim 14, which further includes a heat exchanger disposed in the third stream bypass passage.

16. The apparatus according to claim 11, wherein the second slideable member includes a contour that changes as a function of butt line.

17. The apparatus according to claim 16, wherein a trailing edge of the second slideable member includes a first portion at a first angle to a reference line of the gas turbine engine and an opposing second portion at a second angle to the reference line.

18. The apparatus according to claim 11, wherein a throat of the third stream bypass passage is defined by the second slideable member: and wherein the throat has a contour different than a trailing edge of the second slideable member.

19. The apparatus according to claim 18, wherein the throat has a contour different than a trailing edge of an exit of the nozzle.

20. A method comprising:
operating a gas turbine engine having a core flow path, a bypass path, and a third stream bypass path;
ducting the third stream bypass path from an annular-shaped passage to a laterally displaced passage that extends partially around the gas turbine engine; and
moving a first nozzle member to change a first nozzle flow area through which a working fluid from the core flow path traverses; and
adjusting a second nozzle member in a different manner than the moving to alter a third stream area through which a working fluid from the third stream passes; and
merging the working fluid from the core flow path with the working fluid from the third stream,
wherein the second nozzle member is capable of increasing a flow area of the first nozzle flow area while decreasing the third stream flow area.

21. The method according to claim 20, wherein the adjusting includes sliding the second nozzle member to alter the third stream flow area.

22. The method according to claim 21, wherein the first nozzle flow area through which the working fluid from the core flow path traverses is also changed by the adjusting of the second nozzle member.

23. The method according to claim 22, wherein the different manner includes sliding the second nozzle member in a non-coincident manner to the moving the first nozzle member, and wherein the third stream bypass path includes a first branch and a second branch routed to separate locations in a nozzle that includes the first nozzle member and the second nozzle member.

24. The method according to claim 20, which further includes exchanging heat between a working fluid in a branch of the third stream bypass path with a heat exchanger in thermal communication with a component.

25. The method according to claim 20, which further includes moving the first nozzle member from a forward position to a rearward position when the gas turbine engine is transitioned between a cruise mode and a max thrust mode.

26. The method according to claim 20, which further includes actuating the first nozzle member to slide from a rearward position to a forward position when the gas turbine engine is requested to transition from a dry thrust mode to an afterburning mode.

27. The method according to claim 26, which further includes opening a second nozzle flow area during the afterburning mode, and wherein the opening of the second nozzle flow area occurs when the second nozzle member slides within a plane oriented at an angle to an axial axis of the gas turbine engine.

* * * * *